(12) United States Patent
Peltz

(10) Patent No.: US 6,435,623 B1
(45) Date of Patent: Aug. 20, 2002

(54) VALVE ASSEMBLY FOR ELECTRICALLY CONTROLLED PNEUMATIC BRAKES

(75) Inventor: David M. Peltz, Melbourne, FL (US)

(73) Assignee: GE Harris Railway Electronics, LLC, Melbourne, FL (US)

(*) Notice: Subject to any disclaimer, the term of this patent is extended or adjusted under 35 U.S.C. 154(b) by 0 days.

(21) Appl. No.: 09/604,367

(22) Filed: Jun. 27, 2000

Related U.S. Application Data

(63) Continuation-in-part of application No. 09/169,701, filed on Oct. 9, 1998, now abandoned.
(60) Provisional application No. 60/072,862, filed on Jan. 28, 1998, and provisional application No. 60/061,571, filed on Oct. 10, 1997.

(51) Int. Cl.$^7$ ................................................ B60T 11/26
(52) U.S. Cl. ................................ 303/15; 303/3; 303/20; 303/86
(58) Field of Search ................................ 303/15–18, 3, 303/20, 7, 8, 81, 69, 86, 68, 85, 33, 36, 38, 40, 9.69, 2, 198, DIG. 3, DIG. 4, 22.7, 22.6, 22.5; 702/50, 47, 98, 100; 188/3 H, 3 R, 195; 701/19

(56) References Cited

U.S. PATENT DOCUMENTS

| | | | |
|---|---|---|---|
| 3,799,623 A | * | 3/1974 | Wickham et al. ............. 303/15 |
| 4,049,324 A | | 9/1977 | Cermak |
| 4,181,369 A | | 1/1980 | Balukin et al. |
| 4,264,110 A | | 4/1981 | Washbourn et al. |
| 4,534,599 A | | 8/1985 | Wright et al. |
| 4,679,863 A | | 7/1987 | Ikeda et al. |
| 5,564,794 A | * | 10/1996 | Hart ............................. 303/86 |
| 5,603,556 A | * | 2/1997 | Klink ........................ 303/22.7 |
| 5,615,929 A | | 4/1997 | Broome et al. |
| 5,722,736 A | * | 3/1998 | Cook ........................... 303/15 |
| 5,788,339 A | * | 8/1998 | Wood et al. ................ 303/22.6 |
| 5,862,048 A | | 1/1999 | Knight |
| 5,873,638 A | | 2/1999 | Bezos |
| 5,967,620 A | * | 10/1999 | Truglio et al. ................ 303/15 |
| 6,050,650 A | | 4/2000 | Hart |
| 6,102,491 A | | 8/2000 | Bezos |
| 6,195,600 B1 | | 2/2001 | Kettle, Jr. |
| 6,229,452 B1 | | 5/2001 | Kull |

* cited by examiner

Primary Examiner—Douglas C. Butler
(74) Attorney, Agent, or Firm—Carl A. Rowold; Armstrong Teasdale LLP

(57) ABSTRACT

A method for providing brake control for a rail car having a brake cylinder, a reservoir, and an exhaust vent includes steps of fluidly interconnecting four electrically controlled valves between a train brake pipe, the brake cylinder, the reservoir, and the exhaust vent, and controlling air flow between the brake pipe, car brake cylinder, car reservoir, and exhaust vent using the valves. The above described method allows mixing of conventional ABDW rail cars with ECP-equipped cars in an ECP-equipped train.

27 Claims, 4 Drawing Sheets

VALVE ASSEMBLY FOR ELECTRICALLY CONTROLLED PNEUMATIC BRAKES

CROSS REFERENCE TO RELATED APPLICATIONS

This application is a continuation in part of U.S. application Ser. No. 09/169,701, filed Oct. 9, 1998, now abandoned which claims the benefit of U.S. provisional application Ser. No. 60/061,571, filed Oct. 10, 1997, and U.S. provisional application Ser. No. 60/072,862 filed Jan. 28, 1998.

BACKGROUND OF THE INVENTION

This invention relates generally to air brakes in railway cars and, more particularly, to Electrically Controlled Pneumatic Brakes (ECPBs) used with railcars.

For over one hundred years, train braking has been accomplished pneumatically. Pure air braking operates in the following manner. Air brakes on each car in a train respond to air signals from a brake pipe running the length of the train. When an engineer operates a locomotive brake valve to stop or slow the train, air pressure is reduced along the brake pipe, causing a brake control valve in each car to release air from a reservoir to apply the car brake. When brake pipe air pressure is increased, the brake control valve causes the brake to be released and allows the air supply reservoir to be recharged with air.

Because time is required for brake pipe air to travel from one car to the next, pure air braking is slow and uneven over the length of the train. For example, it can take as long as 15 seconds for a brake pipe pressure change to travel the length of a train having 150 cars. Accordingly, improvements have been made to air braking systems to quicken the braking process. One type of train braking equipment in common use, known as ABDW, is designed such that brake commands are sent as pressure pulses along the brake pipe, are acted upon by each car and sequentially accelerated to the next car. ABDW requirements are specified by the American Association of Railroads (AAR). (AAR also specifies requirements for ABDX equipment, which is similar to ABDW. Any reference herein to one of ABDW or ABDX is deemed to include the other equipment type.) A commonly used ABDW type of brake uses pressure-sensitive mechanical valves and pneumatic volumetric processing to control individual car brakes.

Electronic techniques are known which markedly improve air brake response time and functionality. For example, in Electrically Controlled Pneumatic (ECP) braking, electrical brake commands are sent from the locomotive to each car. Brake commands then are translated into electrical commands which electrically operate the brake control valve. Braking signal propagation time is reduced such that all cars are able to brake almost simultaneously.

Although ECP braking offers significant advantages over ABDW and other air braking systems, rapid conversion of all cars to ECP braking would be expensive. Thus electrical emulation of ABDW is known, whereby pneumatic brake commands are used, but brake air handling is performed electrically. For example, pressure-sensing transducers on a brake pipe detect pneumatic commands and send electrical signals to a computer, which uses the signals to control pneumatic brakes of each car.

ABDW emulation allows an ECP-ready car to operate as part of an ABDW-equipped train. ABDW emulation thus offers a flexible, incremental transition from ABDW-equipped trains to trains using only ECP. It is desirable to provide a simple, economical method for electrical emulation of ABDW in which the number of components is minimized. For even greater flexibility, it also is desirable to allow conventional ABDW cars to be included in trains equipped for ECP braking.

BRIEF SUMMARY OF THE INVENTION

In one embodiment, a method for providing brake control for a rail car having a brake cylinder, a reservoir, and an exhaust vent includes the steps of fluidly interconnecting four electrically controlled valves between a train brake pipe, the brake cylinder, the reservoir, and the exhaust vent, and using an electronic brake controller to operate the valves to control air flow between the brake pipe, car brake cylinder, car reservoir, and exhaust vent. The method further includes configuring the electronic brake controller to respond to conventional pneumatic brake signals and to electronic brake signals, and configuring the electronic brake controller to control the valves to propagate pneumatic signals to other rail cars in a train in response to pneumatic and electronic brake signals.

The above-described valve assembly can withstand minor fluctuations in brake pipe pressure without applying an undesired emergency brake application. The above-described valve assembly operates in ECPB, mixed ECPB/ABDW, and pure ABDW modes of operation. Because the above described brake control system and method allow mixing of conventional ABDW rail cars with ECP-equipped cars in an ECP-equipped train, a gradual and cost-efficient changeover to pure ECP braking is facilitated.

DETAILED DESCRIPTION OF THE INVENTION

Figure 1:
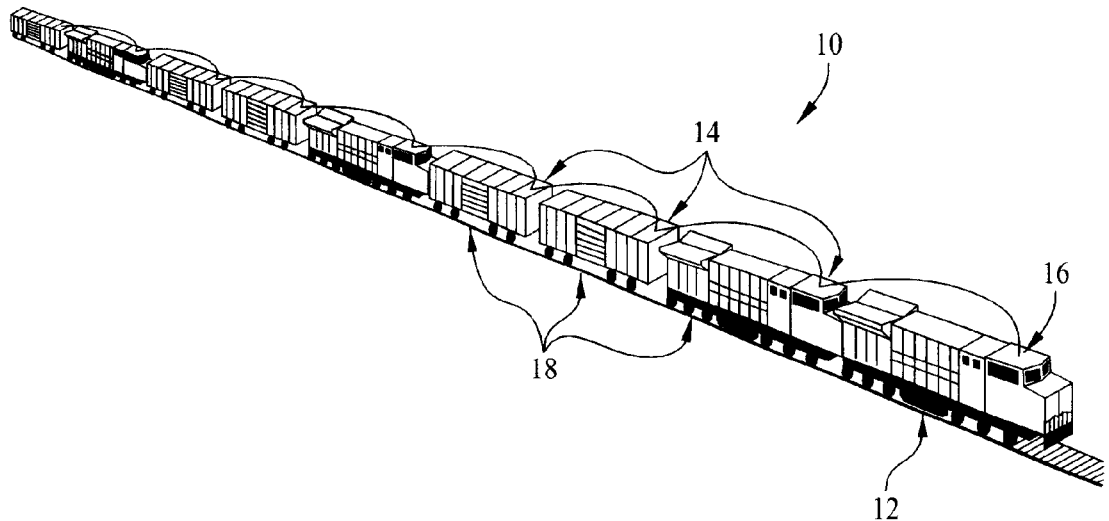
FIG. 1 is an illustration of a train including a plurality of railcars.

FIG. 1 illustrates a train 10 having a head locomotive 12 and one or more additional locomotives and cars 14. Locomotive 12 includes a Head End Unit (HEU) 16 including a communications controller and processor (not shown) that, in one embodiment, control a train communication network (not shown). Each car 14 includes a car control device (CCD) 18 including an electronic brake controller (not shown in FIG. 1) that communicates, e.g. via RF signal, with HEU 16.

Figure 2:
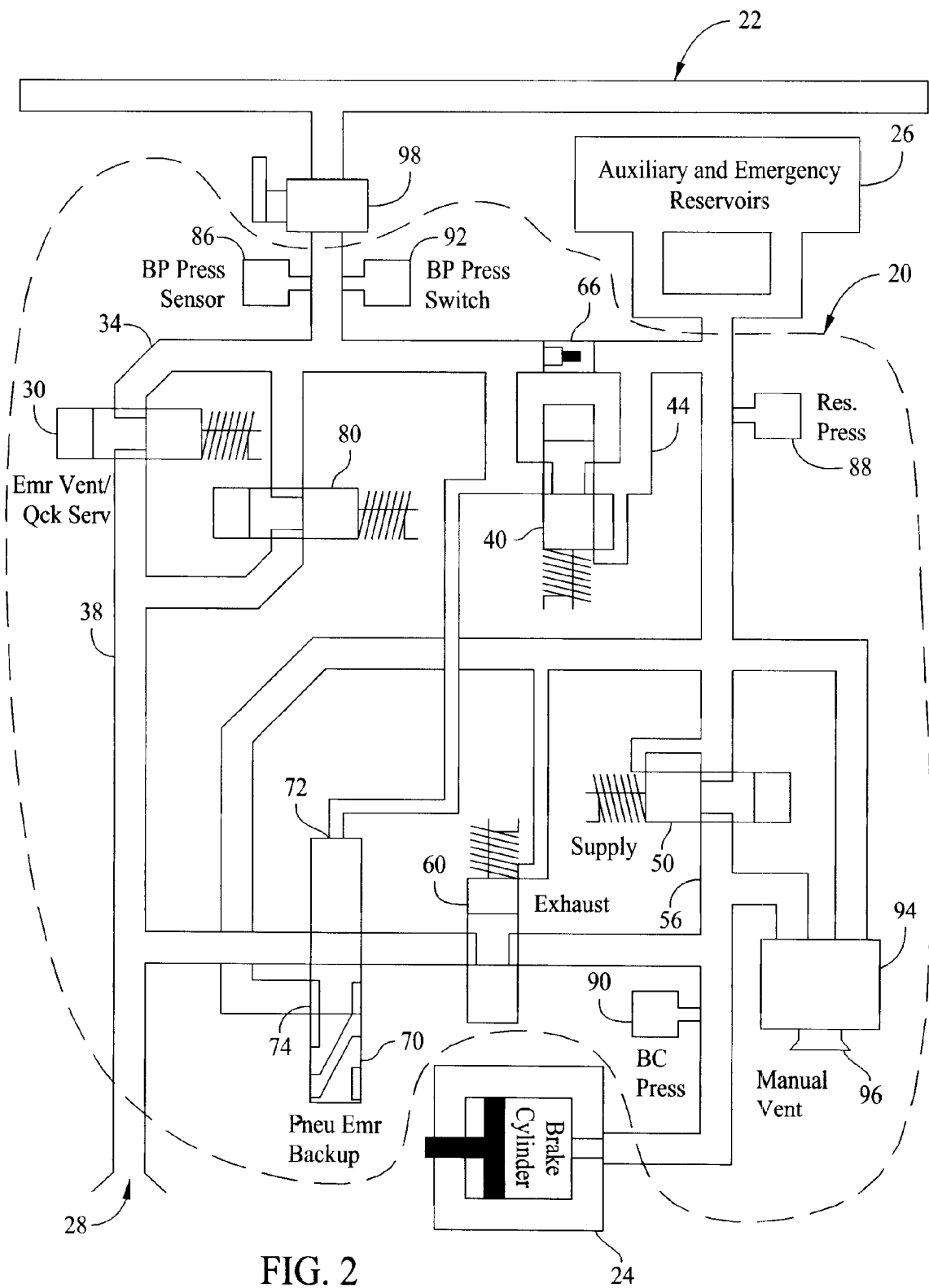
FIG. 2 is a diagram of one embodiment of a brake control valve assembly.

FIG. 2 is a diagram of one embodiment of a car brake control valve assembly 20 installed on a railcar, e.g. one of cars 14. Valve assembly 20 connects to a brake pipe or supply pipe 22 supplying pneumatic pressure to a brake cylinder 24 and a reservoir 26 from a compressor (not shown) in locomotive 12 (shown in FIG. 1). Reservoir 26 includes a main reservoir and an emergency reservoir, which are fluidly joined and not separately shown.

At least four electrically controlled valves, described below, control air flow between brake pipe 22, brake cylinder 24, reservoir 26, and an exhaust vent 28. A first electrically controlled valve, e.g. an emergency/quick-service valve 30, is interconnected between brake pipe 22 and exhaust vent 28. More specifically, a brake pipe passageway 34 fluidly connects valve 30 to brake pipe 22 and an exhaust passageway 38 fluidly connects valve 30 to exhaust vent 28. A second electrically controlled valve, e.g. a quick-release valve 40, is interconnected between reservoir 26 and brake pipe 22. Specifically, a reservoir passageway 44 fluidly connects valve 40 to reservoir 26, and brake pipe passageway 34 fluidly connects valve 40 to brake pipe 22.

A third electrically controlled valve, e.g. a supply valve 50, is interconnected between reservoir 26 and brake cylinder 24. More specifically, reservoir passageway 44 fluidly connects valve 50 to reservoir 26, and a brake cylinder passageway 56 fluidly connects valve 50 to brake cylinder 24. A fourth electrically controlled valve, e.g. an exhaust valve 60, is interconnected between brake cylinder 24 and exhaust vent 28. Specifically, brake cylinder passageway 56 fluidly connects valve 60 to brake cylinder 24, and exhaust passageway 38 fluidly connects valve 60 to exhaust passageway 38.

A pneumatic check valve 66 is connected in fluid communication between reservoir passageway 44 and brake pipe passageway 34. In an alternative embodiment check valve 66 is electronically controlled. In one embodiment, a pneumatic back-up valve 70 also is connected between exhaust valve 60 and exhaust passageway 38. A port 72 of pneumatic back-up valve 70 is connected to brake pipe passageway 34 and a port 74 of valve 70 is connected to reservoir passageway 44.

In yet another embodiment, an electrically controlled accelerated vent valve 80 is fluidly connected to brake pipe passageway 34 and to exhaust passageway 38. Electrically controlled valves 30, 40, 50, 60 and 80 are obtained, for example, from the Ross Operating Valve Company in Lavonia, Ga.

An electronic brake controller (not shown in FIG. 2) is electrically connected to valves 30, 40, 50 and 60 (and, in one embodiment, valve 80) and controls fluid flow within passageways 34, 38, 44, and 56. Pressure sensors, e.g. a brake pipe pressure (BPP) sensor 86, a reservoir pressure (RP) sensor 88, and a brake cylinder pressure (BCP) sensor 90, sense pressure respectively in brake pipe passageway 34, reservoir passageway 44, and brake cylinder passageway 56 and send signal outputs to the electronic brake controller. In one embodiment a BPP switch 92 is connected to brake pipe passageway 34 and a manual vent switch 94 is connected to a manual vent 96. As described below, switches 92 and 94 are electrically connected to the electronic brake controller. A cut-out valve 98 connects brake pipe 22 to valve assembly 20.

Figure 3:
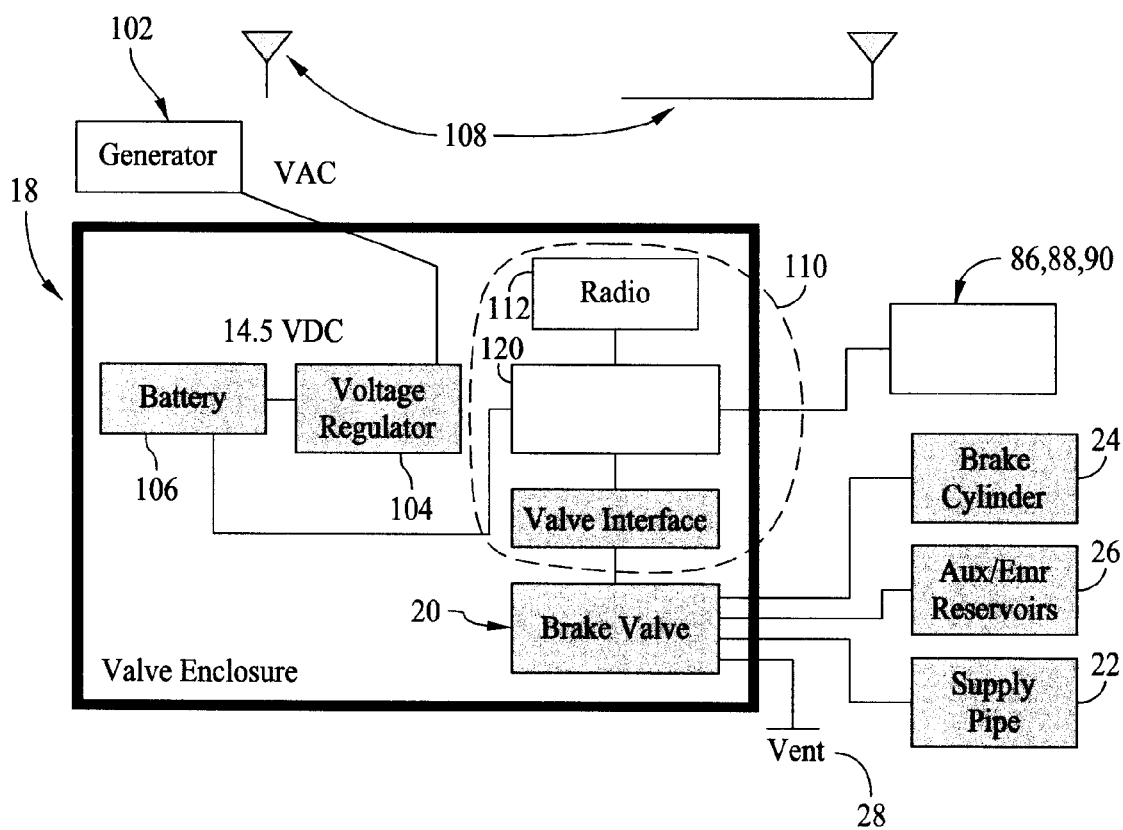
FIG. 3 is a block diagram of a car control device (CCD)

Referring to FIG. 3, car control device (CCD) 18 includes a power generator, e.g. an axle generator or pneumatic power generating source 102, a voltage regulator 104, a battery 106, two antennas 108, brake valve assembly 20, and an electronic brake controller (EBC) 110. EBC 110 includes a processor 120, e.g. a Motorola 68360 processor. In one embodiment EBC 110 includes a radio 112 for communication with HEU 16. EBC 110 serves as a communications controller for CCD 18, e.g. with respect to the train communication network, and also serves as a controller for brake valve assembly 20. EBC 110 includes first, second, and third signal inputs (not shown) corresponding to the respective output signals of pressure sensors 86, 88, and 90 such that EBC 110 uses the sensed pressure in controlling brake valve 20.

Valve assembly 20 is controlled and operates in one of three modes of operation. For a car 14 (shown in FIG. 1) that is part of a fully electronic brake train such as train 10 (shown in FIG. 1), valve assembly 20 operates in an ECP mode, e.g. in conformance with AAR requirements for ECPB systems. CCD 18 then receives brake commands via the train communication network. For a car 14 that is part of a conventional ABDW train, valve assembly 20 does not receive brake commands from a Head End Unit (HEU) equipped locomotive, but instead emulates ABDW performance, i.e. car 14 responds to conventional brake pipe 22 pressure signals.

In another embodiment car 14 is part of a mixed train, i.e. a train having a combination of conventional ABDW cars and ECP-equipped cars, and valve assembly 20 receives brake commands from an HEU such as HEU 16. Valve assembly 20 then also propagates pneumatic signals for conventional ABDW cars within the mixed train or within a mixed consist (not shown).

In all of the foregoing modes, EBC 110, e.g. via software in EBC 110, converts operator commands into brake actions, as commanded either by a HEU 16 or by brake pipe 22 signals as interpreted by EBC 110 from information supplied by, e.g., pressure sensors 86, 88, and 90.

Reservoir 26 is constantly charged with filtered air from supply pipe 22. When an application command is received by EBC 110 from locomotive 12, air is allowed to pass through one or more of electrically controlled valves 30, 40, 50, 60 and 80 to brake cylinder 24. Regulation of air flow for emergency applications is, of course, different from air flow regulation for service applications. A release command from locomotive 12 causes air to be exhausted through exhaust valve 60.

Manual vent switch 94 provides digital input to EBC 110 that is used to vent reservoir 26 and brake cylinder 24. EBC 110 software periodically checks a processor 120 parallel port input pin connected to the manual vent switch 94. If car 14 is not moving, then closing of switch 94 closes supply valve 50 and opens exhaust valve 60. Closure of switch 94 is debounced using EBC 110 software. If switch 94 is pushed and held for more than three seconds, then supply valve 50 is opened only as long as switch 94 is pushed. On release, supply valve 50 is closed. Switch 94 closure overrides any current brake application, but if a new application begins during switch 94 closure it overrides venting of brake cylinder 24 only. If switch 94 is pushed and held for more than three seconds, any application request while switch 94 is being held is ignored.

Valves 30, 40, 50, and 60 are controlled by EBC 110 and supporting software and operate in the following manner. Supply valve 50 opens to supply pressure from reservoir 26 and/or brake pipe 22 to brake cylinder 24 until a brake cylinder pressure calculated by EBC 110 software is reached. In one embodiment supply valve 50 also opens to supply brake cylinder 24 pressure to brake pipe 22.

Exhaust valve 60 exhausts pressure from brake cylinder 24. As described below, if pneumatic back-up valve 70 activates when brake pipe 22 pressure drops below 40 psi, exhaust valve 60 is kept closed to prevent over-pressure in brake cylinder 24. Exhaust valve 60 is actively controlled by EBC 110 to increase a rate of charging reservoir 26.

Quick-release valve 40 opens for quick recharge of brake pipe 22 using reservoir 26 and brake cylinder 24 pressure. Quick-release valve 40 also opens for final charge of reservoir 26 using brake pipe 22 and is actively controlled to increase a rate of charging reservoir 26.

For quick service, emergency/quick-service valve 30 opens to partially exhaust brake pipe 22 pressure. In ABDX mode, valve 30 is used to accelerate pressure drop in brake pipe 22. In an emergency, valve 30 opens to quickly exhaust brake pipe 22 pressure. For an emergency in ABDX mode, or for a communication loss emergency as further described below, valve 30 is used to accelerate pressure drop in brake pipe 22.

EBC 110 determines a brake pipe pressure reduction rate for use in regulating valves 30, 40, 50 and 60. EBC 110 uses a pressure sensed from reservoir pressure sensor or pressure transducer 88 as a reference rate for determining the brake pipe pressure reduction rate. Thus no need exists to maintain a reservoir separate from reservoir 26 for the purpose of obtaining a reference brake pipe pressure reduction rate.

In one embodiment, EBC 110 is also electrically connected to accelerated vent valve 80. Accelerated vent valve 80 permits constricted flow from brake pipe passageway 34 to exhaust passageway 38 relative to emergency valve 30. In such configuration and in one embodiment, accelerated vent valve 80 permits less than one percent of the fluid flow relative to emergency valve 30. Accelerated vent valve 80 reduces emergency braking sensitivity to temporary brake pipe pressure changes.

In other embodiments, other valves not directly controlled by EBC 110 software operate as follows. When a pressure in brake pipe passageway 34 exceeds a pressure in reservoir passageway 44, then pneumatic back-up valve 70 fluidly connects exhaust valve 60 with exhaust passageway 38. Conversely, when a pressure in reservoir passageway 44 exceeds a pressure in brake pipe passageway 34, then valve 70 fluidly connects quick-release valve 40 with reservoir passageway 44. Pneumatic back-up valve 70 in one embodiment is a pneumatically piloted change over back-up valve. Pneumatic back-up valve 70 supplies pressure from reservoir 26 to brake cylinder 24 when pressure in brake pipe 22 is less than 40 psi. Valve 70 applies pressure even when power fails. If valve 70 applies pressure when power is on and EBC 110 is operational, then effects of valve 70 are mitigated by keeping exhaust valve 60 closed, thereby allowing EBC 110 to control a final pressure of brake cylinder 24.

Check valve 66 allows brake pipe 22 to charge reservoir 26 when brake pipe 22 pressure is greater than that of reservoir 26, but prevents reservoir 26 pressure from charging brake pipe 22 unless quick-release valve 40 is open. Cut-off valve 98 disables pressure to brake valve 20. If valve 98 is closed, pressure is maintained in brake pipe passageway 34 until a first application starts to release it.

A maximum full service pressure in brake cylinder 24, as set by EBC 110, is determined in accordance with:

$$P_{BC(FS)} = 0.711 * P_S \quad (1)$$

where $P_{BC}$ is brake cylinder pressure and $P_S$ is supply pipe pressure. A maximum emergency brake cylinder pressure $P_{BC(EM)}$ is determined in accordance with:

$$P_{BC(EM)} = 1.2 * P_{BC(IS)} \quad (2)$$

Maximum emergency brake cylinder pressure as determined by foregoing Equation 2 defines a baseline for maximum cylinder pressure for a given supply pipe pressure. A maximum brake cylinder pressure $P_{BC(MAX)}$ is defined by AAR as 100 percent of full service, with all brake applications based as a percentage of $P_{BC(MAX)}$. Emergency in such case is determined according to Equation 2 to equal 120 percent of full service. Hence a maximum brake cylinder pressure in the controller, $P_{BC(MAX)}$, is set in EBC 110 as 100 percent of emergency cylinder pressure. All brake applications then are based as percentages of this full scale setting. Correlation between AAR definitions and definitions according to one embodiment are set forth in the following table.

| Application | AAR Performance Specification % of $BC_{FS}$ | GEH-ECP % of $BC_{EM}$ |
|---|---|---|
| Minimum Service Application | 15% | 8.3% |
| Full Service Application | 100% | 83% |
| Emergency Application | 120% | 100% |

Figure 4:
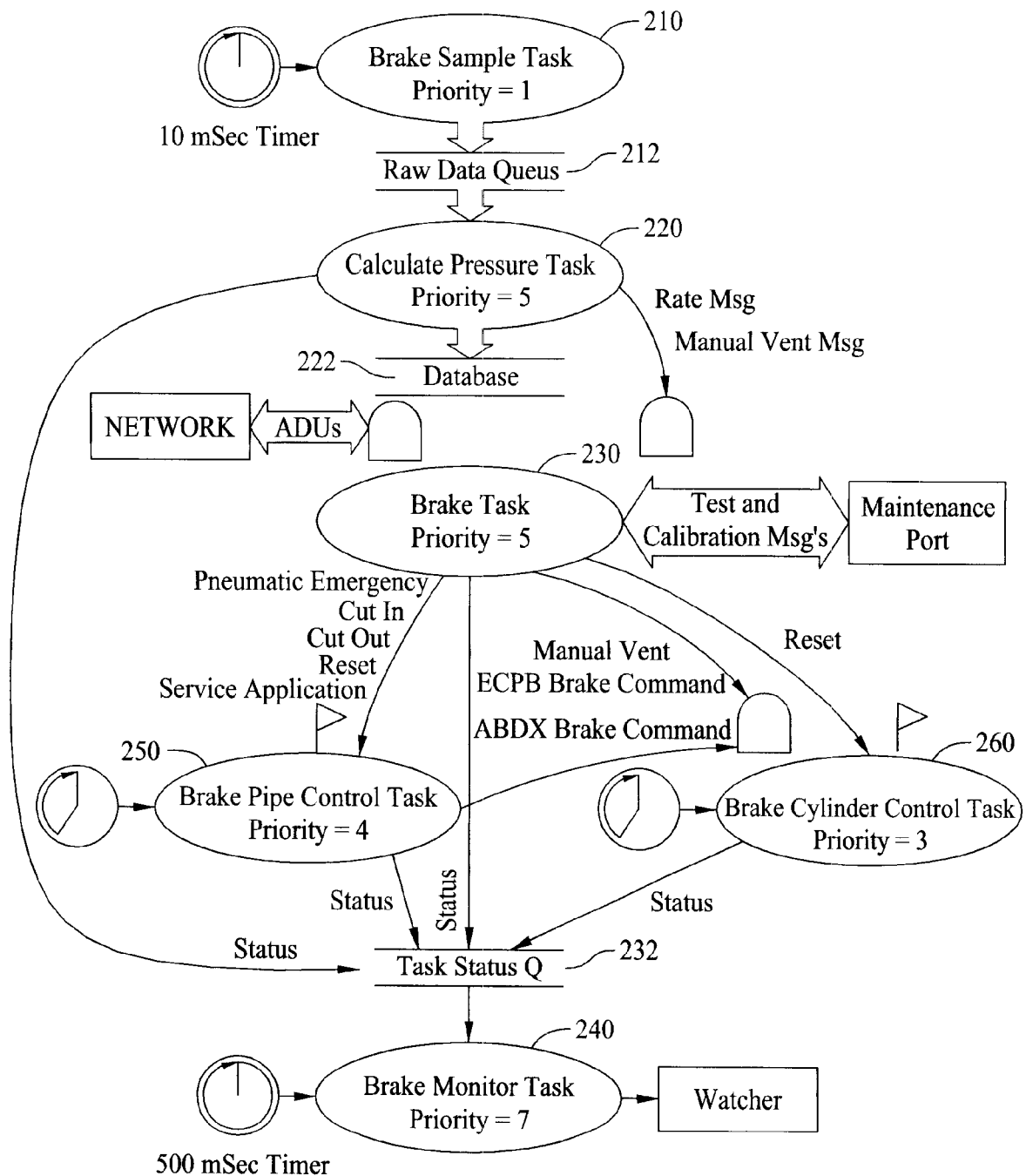
FIG. 4 is a diagram of tasks performed by a brake control system.

EBC 110, via software, controls brake assembly 20 and also interfaces with the train communication network. Such software is implemented, for example, as state machines (not shown) controlling various operations of brake assembly 20. FIG. 4 is a flow diagram of tasks that perform brake control in one embodiment. Such tasks are run using, e.g., processor 120. Although the following described tasks are described in terms of software, brake control tasks in other embodiments are implemented in software, hardware, firmware, or a combination thereof.

Brake Sampling Task 210 reads analog-to-digital (A/D) converters (not shown) over a determined period, e.g. every ten milliseconds, to obtain pressures from brake pipe 22, reservoir 26 and brake cylinder 24 as well as voltage of battery 106. Brake Sampling Task 210 enqueues the raw data into a raw data queue 212.

A Brake Pressure Calculation Task 220 averages, or determines means of, the raw A/D data in data queue 212 and then converts the average values into pressure and voltage measurement values and stores them into a data base 222 for use by other tasks. The pressure readings have calibration factors (gain and offset) applied. Brake Pressure Calculation Task 220 also performs rate calculations to determine service and emergency applications on valve assembly 20. Brake Pressure Calculation Task 220 periodically monitors and debounces manual vent switch 94. When manual vent switch 94 is on and train 10 is not moving, Brake Pressure Calculation Task 220 sends a Manual Vent message to a Brake Task 230 further described below. Brake Pressure Calculation Task 220 sends a message to vent brake cylinder 24 when manual vent switch 94 is first pressed. If manual vent switch 94 is held for longer then a defined period, e.g. 3 seconds, a message is sent to vent reservoir 26 for as long as manual vent switch 94 is being held. When manual vent switch 94 is released, a message is sent to close supply valve 50. Exhaust valve 60 remains open until the next brake application.

Brake Pressure Calculation Task 220 looks for a change in the pressure of brake pipe 22 that is indicated by BPP sensor 86 and EBC 110 to be at an emergency rate (16 psi per second or greater). Task 220 then sends an Emergency rate mail message to Brake Task 230. Task 220 also looks for a change in brake pipe pressure that is indicated by BPP sensor 86 and EBC 110 to be at a service rate (less than 16 psi per second but greater than 0.385 psi per second). Brake Pressure Calculation Task 220 then sends a Service rate mail message to Brake Task 230.

If previously enabled in Brake Task 230, Brake Pressure Calculation Task 220 sends data to a train network maintenance port to be used for such maintenance functions as sensor calibration and data logging. Periodically, e.g. at every Nth sample taken by Brake Sampling Task 210, Brake Pressure Calculation Task 220 enqueues a status message to a task status queue 232 for use by a Brake Monitor Task 240 further described below.

Brake Task 230 handles startup of a brake application. More particularly, Brake Task 230 registers the application with the train network, waits for acknowledgment and then receives a handle from the network. Brake Task 230 looks for a message from Brake Pressure Calculation Task 220 that a change in brake pipe 22 pressure has been determined by EBC 110 via BPP sensor 86 to be at an emergency rate (e.g. 16 psi/sec or greater). If valve assembly 20 is operating in ABDX mode, Brake Task 230 then sends a Pneumatic Emergency semaphore or system-synchronized message to a Brake Pipe Pressure Control Task 250, further described below, to propagate the emergency and to tell a Brake Cylinder Pressure Control Task 260, further described below, to apply the brakes at an emergency level. If valve assembly 20 is in ECPB mode, then Brake Task 230 sends a fault notification message to HEU 16. If HEU 16 responds with a commanded emergency, then Brake Task 230 sends a 120% BrakeEffort mail message to Brake Cylinder Pressure Control Task 260. Such emergency is not propagated on brake pipe 22.

In ABDX mode Brake Task 230 looks for a message from Brake Pressure Calculation Task 220 that a change in brake pipe pressure has been determined by EBC 110, via sensor 86, to be at a service rate (e.g. between 0.385 and 16 psi per second). Brake Task 230 then sends a Service Rate semaphore to Brake Pipe Pressure Control Task 250 to tell it to start an application.

In one embodiment Brake Task 230 sends a semaphore to both Brake Pipe Pressure Control Task 250 and Brake Cylinder Pressure Control Task 260 for state machines to be reset and restarted in a known good state. For example, when changing between ABDX and ECPB modes, Brake Task 230 sends a semaphore to both Brake Pipe Pressure Control Task 250 and Brake Cylinder Pressure Control Task 260 for state machines to be cut in or out to support brake cut-in or cut-out as a result of a command from HEU 16, the maintenance port, or due to CCD 18 failure.

Brake Task 230 interfaces with the maintenance port for valve assembly 20 testing and calibration. Brake Task 230 calls routines (not shown) to check for input from and to send data to the maintenance port.

Brake Task 230 maintains a mailbox and sends and receives messages from other EBC 110 or train network tasks. In ECPB mode, Brake Task 230 receives brake commands from HEU 16 and for each valid brake command it sends a brake effort mail message to Brake Cylinder Pressure Control Task 260, enqueues a "good brake command" status to task status queue 232 for Brake Monitor Task 240, and turns on a LED (not shown) status indicator which will be turned off by Brake Monitor Task 240 when the status is dequeued. Brake Task 230 validates brake commands from HEU 16. Brake Task 230 checks for a properly incrementing command sequence number and compares two copies of the brake command for a match. Any command not validated is ignored. Brake Task 230 periodically enqueues a status message to task status queue 232 for Brake Monitor Task 240. Such messages are triggered by events such as brake commands, train network messages and brake pipe 22 pressure rate changes and are sent periodically, e.g. every 250 milliseconds, if not otherwise triggered by EBC 110.

Brake Monitor Task 240 monitors status of the above-described tasks and other brake tasks not explicitly described herein. Each task sends a status message to task status queue 232. Brake Monitor Task 240 periodically checks for receipt of a status message from each task and periodically updates a train communication network watcher task to let it know that EBC 110 software is running, to hold off a "watch dog" timer in the watcher task. In one embodiment Brake Monitor Task 240 has a lowest priority of the EBC 110 brake tasks, since the watcher task is notified if other EBC 110 tasks are being starved of processor 120 time.

Brake Monitor Task 240 controls handling of a vital communication loss. If no messages confirming communication with other tasks have been received within a task guard time (e.g. 500 milliseconds), Brake Monitor Task 240 sends an asynchronous message twice to the train network. If only one or no car in train 10 responds to the asynchronous messages, then a CutOutBrakes semaphore is sent to Brake Task 230 to release and cut out brakes. If two or more cars respond to the asynchronous messages, then a PneumaticEmergency semaphore is sent to Brake Task 230 to vent brakepipe 22 and apply brakes at an emergency level.

Brake Pipe Pressure Control Task 250 both monitors and controls pressure in brake pipe 22. In ABDX mode, Brake Pipe Pressure Control Task 250 reads fluctuations in brake pipe 22 to determine amounts of pressure in brake cylinder 24 to apply or release. In ABDX mode. Brake Pipe Pressure Control Task 250 uses quick-release valve 40 and quick-service valve 30 to control brake pipe pressure. More specifically, it uses quick-service valve 30 to propagate an application and quick-release valve 40 to perform a final charge of reservoir 26 from brake pipe 22 and to recharge brake pipe 22 from reservoir 26.

Brake Pipe Pressure Control Task 250 also initiates, or, as the case may be, helps propagate a pneumatic emergency. A pneumatic emergency occurs in ABDX mode if brake pipe pressure drops by 16 psi per second or more, or in ECPB mode during Communication loss emergency. If Brake Pipe Pressure Control Task. 250 receives a PneumaticEmergency semaphore, emergency valve 30 is opened to propagate an emergency. A BrakeEffort mail message is sent to Brake Cylinder Pressure Control Task 260 to set an emergency application. Brake Pipe Pressure Control Task 250 also controls emergency recovery as brake pipe 22 recharges to a normal level.

Brake Cylinder Pressure Control Task 260 controls brake cylinder pressure. Brake Cylinder Pressure Control Task 260 receives a BrakeEffort mail message from either Brake Task 230 (in ECPB mode) or Brake Pipe Pressure Control Task 250 (in ABDX mode) specifying what brake effort to apply. Brake Pipe Pressure Control Task 250 converts the requested brake effort (e.g. from zero to 120 percent) to a target brake cylinder 24 pressure and calculates time needed to open the appropriate valve(s) to reach this pressure. After such valve (s) have opened for such period of time, a software delay is initiated to obtain a brake cylinder pressure change rate reading via BCP sensor 90 and EBC 110. Then, if actual pressure is not within a tolerance value of the target pressure, Brake Cylinder Pressure Control Task 260 recalculates time based on current pressure and tries again for a finite number of times. If brake effort requested is zero percent (i.e. to have brakes released), then exhaust valve 60 is opened and left open. If in ABDX mode the requested brake effort is 120 percent (emergency), then supply valve 50 is opened to equalize reservoir 26 with brake cylinder pressure and is left open.

EBC 110 software detects a failure of vital communications to the train network node to which valve assembly 20 is assigned. Such failures include a passage of a guard time (typically 6 seconds) in which EBC 110 software receives no new valid brake commands from HEU 16. In event of a failure of vital communications EBC 110 generates a loss-of-vital-communications message to the train network. In event of a local failure of vital communications, EBC 110 causes brake release by valve assembly 20. If failure of vital communications is system-wide, EBC 110 applies brakes at an emergency level and vents brake pipe 22.

In one embodiment, EBC 110 software performs the following brake control functions. HEU 16 provides car loading information to EBC 110 at link time. EBC 110 also is able to determine car loading with a load sensor at the link time. EBC 110 uses the car loading information to regulate the valve assembly brake level. CCD 18 adjusts brake cylinder 24 pressure for any application in proportion to a percentage of gross rail load messages received via the train network, or from a load weigh device (not shown), or from a default value stored in e.g. processor 120 memory. Using information from ECB 110 and pressure sensors 86,88 and 90, CCD 18 pressurizes brake cylinder 24 within, e.g., plus or minus 2 psi of the calculated brake cylinder pressure. CCD 18 uses a brake pipe setting (sometimes referred to as feed valve setting, or equalizing reservoir setting) received via the train network for calculating a full service brake cylinder 24 pressure for a trip.

EBC 110 applies brakes in a graduated manner after an initial minimal service and releases brakes in a graduated manner in ECPB mode and in a direct manner in ABDX mode. EBC 110 commands all brake applications with a resolution of plus or minus 1 percent brake effort. EBC 110 uses 12.8 percent as a default brake ratio. This value can be changed by HEU 16 at link time. When operating in ECP mode, CCD 18 gives precedence to commands received via the train network over pneumatic operation, even if the brake pipe pressure falls below 40 psi. Once the brake pipe pressure exceeds 40 psi, the emergency brake cylinder pressure is released.

CCD 18 suspends all modes of failure operation when switching between operating modes, except when loss of communication or loss of pressure is encountered. While operating in ECP mode, CCD 18 maintains a current brake application after a "loss of communication" guard time has expired and asynchronously sends a "loss of signal" message to the train network. If CCD 18 subsequently receives "loss of signal" messages from vital applications on two or more other CCDs, it makes an emergency brake application and vents brake pipe 22 at an emergency rate. CCD 18 maintains an emergency brake application on standing cars for at least one hour or until communications with those cars and HEU 16 is reestablished.

Each CCD 18 in train 10 responds to an appropriate status query by transmitting such information as the brake pipe pressure, the brake cylinder pressure, the reservoir pressure, the battery voltage, speed or wheel rotation information and CCD's cut-in/cut-out status. If CCD 18 receives a "loss of signal" from no more than one other CCD after transmitting a "loss of signal" message, CCD 18 cuts itself out and vents brake cylinder 24 to atmosphere.

In ABDX emulation mode, CCD 18 initiates emergency brake application and emergency quick action brake pipe 22 venting, when the brake pipe pressure falls at greater than 16 psi per second. A CCD which had taken itself off-line for communication loss resumes normal brake operations after explicit communication with HEU 16 has been re-established.

CCD 18 provides ABDX-style emergency quick action, quick service, accelerated application, and quick release functionality. In emulation mode, CCD 18 does not initiate a brake release if the brake pipe pressure is not rising and the reservoir pressure is falling. In emulation mode, CCD 18 does not perform or cease any service brake application that will bring the reservoir pressure below that of brake pipe 22. In emulation mode, CCD 18 does not perform or cease any service brake application that will bring the reservoir pressure below 40 psi.

The above described brake valve assembly uses a minimal number of electrical valves and thus can be fabricated inexpensively compared to other valve assemblies in use. The above described brake valve assembly and brake control system allow ECP-ready cars to be included in conventional ABDW trains and also allow conventional ABDW cars to be included in a train operating in ECP mode. Thus greater flexibility is available, at lower cost, in converting trains to all-ECP operation.

While the invention has been described in terms of various specific embodiments, those skilled in the art will recognize that the invention can be practiced with modification within the spirit and scope of the claims.

What is claimed is:

1. A method for providing brake control for a rail car including a brake cylinder, a reservoir, and an exhaust vent, said method comprising the steps of:

fluidly interconnecting four electrically controlled valves between a train brake pipe, the brake cylinder, the reservoir, and the exhaust vent;

interconnecting an exhaust valve between the brake cylinder and the exhaust vent;

controlling air flow between the brake pipe, car brake cylinder, car reservoir, and exhaust vent using the valves; and interconnecting a back-up valve between the exhaust valve and the exhaust vent.

2. A method in accordance with claim 1 further comprising the step of configuring an electronic brake controller to propagate pneumatic signals using the valves in response to pneumatic and electronic brake signals.

3. A method in accordance with claim 1 further comprising the step of controlling air flow using an electronic brake controller and signals from a brake pipe pressure sensor, a reservoir pressure sensor and a brake cylinder pressure sensor.

4. A method in accordance with claim 3 further comprising the step of configuring the electronic brake controller to determine a brake pipe pressure reduction rate using a pressure from the reservoir pressure sensor as a reference rate.

5. A method in accordance with claim 1 wherein said step of fluidly interconnecting four electrically controlled valves further comprises the steps of:

interconnecting an emergency/quick-service valve between the brake pipe and the exhaust vent;

interconnecting a quick-release valve between the reservoir and the brake pipe;

interconnecting a supply valve between the reservoir and the brake cylinder; and interconnecting an exhaust valve between the brake cylinder and the exhaust vent.

6. A method in accordance with claim 5 further comprising the step of regulating flow between the reservoir passageway and the brake pipe passageway using a check valve.

7. A method in accordance with claim 5 further comprising the step of actively controlling the quick-release valve to increase a rate of charging the reservoir.

8. A method in accordance with claim 1 further comprising the step of reducing emergency braking sensitivity to temporary brake pipe pressure changes using an accelerated vent valve.

9. A method in accordance with claim 1 further comprising the step of, in response to a drop in brake pipe pressure, routing a flow from the reservoir through the exhaust valve to the brake cylinder using the back-up valve.

10. A method in accordance with claim 9 further comprising the step of controlling the exhaust valve to control a final pressure of the brake cylinder.

11. A rail car brake control valve assembly comprising:
a plurality of electrically controlled valves comprising a first, a second, a third, and an exhaust valve;
a brake pipe passageway fluidly connecting said first valve to a brake pipe;
an exhaust passageway fluidly connecting said first valve to an exhaust vent;
a brake cylinder passageway fluidly connecting said third valve to a brake cylinder;
a back-up valve fluidly connected between said exhaust valve and said exhaust passageway; and
a reservoir passageway fluidly connecting said third valve to a reservoir, said second valve interposed between, and fluidly connectable to, said brake pipe passageway and said reservoir passageway, said exhaust valve interposed between, and fluidly connectable to, said brake cylinder passageway and said exhaust passageway.

12. A control valve assembly in accordance with claim 11 further comprising an electronic brake controller configured to transmit signals to said valves to control fluid flow within said passageways.

13. A control valve assembly in accordance with claim 12 further comprising:
a brake pipe pressure sensor connected to said brake pipe passageway;
a reservoir pressure sensor connected to said reservoir passageway; and
a brake cylinder pressure sensor connected to said brake cylinder passageway, said electronic brake controller further configured to use signals from said pressure sensors for controlling said electrically controlled valves.

14. A control valve assembly in accordance with claim 12 further comprising an accelerated vent valve interposed between, and fluidly connected to, said brake pipe passageway and said exhaust passageway.

15. A control valve assembly in accordance with claim 14 wherein said accelerated vent valve is further configured to permit a constricted flow relative to said first valve.

16. A control valve assembly in accordance with claim 15 wherein said accelerated vent valve is further configured to permit a flow of less than one percent of a flow through said first valve.

17. A control valve assembly in accordance with claim 14, said accelerated vent valve connected to said electronic brake controller.

18. A control valve assembly in accordance with claim 12, said electronic brake controller further configured to respond to pneumatic brake signals communicated to said brake pipe passageway.

19. A control valve assembly in accordance with claim 12, said electronic brake controller further configured to respond to electronic brake signals communicated from a head end controller.

20. A control valve assembly in accordance with claim 12, said electronic brake controller further configured to propagate pneumatic signals to other rail cars in a train.

21. A control valve assembly in accordance with claim 11 further comprising a check valve interposed between, and fluidly connectable to, said reservoir passageway and said brake pipe passageway.

22. A control valve assembly in accordance with claim 11 wherein said reservoir passageway is connectable to a main reservoir and an emergency reservoir which are fluidly joined.

23. A control valve assembly in accordance with claim 11 wherein said back-up valve fluidly connecting said brake pipe passageway and said reservoir passageway, said back-up valve further configured to fluidly connect said exhaust valve to said exhaust passageway when a pressure in said brake pipe passageway exceeds a pressure in said reservoir passageway, said back-up valve further configured to fluidly connect said second valve to said reservoir passageway when a pressure in said reservoir passageway exceeds a pressure in said brake pipe passageway.

24. A control valve assembly in accordance with claim 23, said back-up valve further comprising a pneumatically piloted change over back-up valve.

25. A method for operating an air brake on a rail car including an electronic brake controller and a brake cylinder, said method comprising the steps of:
providing rail car loading information to the electronic brake controller from at least one of a head end unit, and a default value stored in the electronic brake controller;
determining a rail car brake level using the rail car loading information; and
regulating rail car brake cylinder pressure using the rail car loading information.

26. A method in accordance with claim 25 wherein said step of providing rail car loading information to the electronic brake controller comprises providing rail car loading information from at least one of a load sensor, and a load weigh device.

27. A method in accordance with claim 25 wherein the rail car includes a reservoir and an exhaust vent, said method further comprises the steps of:
fluidly interconnecting four electrically controlled valves between a train brake pipe, the brake cylinder, the reservoir, and the exhaust vent; and
using the electronic brake controller to operate the valves to control air flow between the brake pipe, car brake cylinder, car reservoir, and exhaust vent.

* * * * *